United States Patent

[11] 3,601,211

| [72] | Inventor | Ernst-Gunter Finke |
| | | Heidenheim, Germany |
| [21] | Appl. No. | 605,529 |
| [22] | Filed | Dec. 22, 1966 |
| [45] | Patented | Aug. 24, 1971 |
| [73] | Assignee | Voith Getriebe KG |
| | | Heidenheim (Brenz), Germany |
| [32] | Priority | Dec. 22, 1965 |
| [33] | | Germany |
| [31] | | V 30 002 |

[54] STEERING ARRANGEMENT FOR A TRACK-LAYING VEHICLE
3 Claims, 4 Drawing Figs.

[52] U.S. Cl. ............................................. 180/6.66,
74/710.5, 180/6.7
[51] Int. Cl. ............................................. B62d 11/00
[50] Field of Search ............................................. 305/44;
180/6.2, 6.7, 6.66; 74/710.5, 720.5, 782

[56] References Cited
UNITED STATES PATENTS

| 2,343,509 | 3/1944 | Jandasek ..................... | 74/782 |
| 2,560,554 | 7/1951 | Colby ........................... | 74/720.5 |
| 2,585,790 | 2/1952 | Kelley .......................... | 180/6.7 |
| 3,137,182 | 6/1964 | Berchtold et al. ............ | 74/720.5 |
| 3,303,723 | 2/1967 | Ruf ................................ | 180/6.7 |

Primary Examiner—Samuel W. Engle
Attorney—Michael S. Striker

ABSTRACT: Differential transmissions control the differential drives of the endless tracks for a vehicle, and are selectively braked to cause relative speed changes of the differential drives and tracks so that the vehicle turns.

STEERING ARRANGEMENT FOR A TRACK-LAYING VEHICLE

BACKGROUND OF THE INVENTION

The present invention is concerned with a drive for a track-laying vehicle, and more particularly with a drive of the type in which a pair of gear transmissions drive two endless tracks of the Caterpillar type.

According to prior art constructions, the differential gear drives comprise gears meshing with gears on a control shaft, sometimes referred to as "zero" shaft. The control shaft connects elements of the transmissions with each other so that a torque can be transmitted by the transmissions from a main drive shaft to the endless tracks. When the control shaft is caused to rotate in one or the other direction of rotation, the tracks are driven at different speeds so that the vehicle makes a turn.

It is known to control the number of revolutions and the direction of rotation of the control shaft by control transmissions including friction clutches. A disadvantage of this construction is the great wear of the parts, and the great amount of heat which develops, particularly at high torques. To overcome these disadvantages, fluid couplings have been substituted for friction clutches, which have the disadvantage that the time required for filling and emptying the fluid couplings causes a delay in the control of the tracks so that the vehicle does not immediately turn when the fluid coupling is manually operated.

While smaller fluid couplings would require shorter filling and emptying times, the rotary speed of the fluid coupling would have to be increased to maintain the same transmissible torque. Due to the fact that the rotary speed of the control shaft is not permitted to exceed a certain value, complicated transmission mechanism is required since the rotary speed has to be first increased and then reduced.

Another disadvantage is that, assuming a constant torque required for the steering operation, varying rotary speeds of the control shaft cause unstable conditions when the steering is controlled by a fluid coupling. The torque transmitted through the fluid coupling to the control shaft is substantially constant in the lower range of the rotary speed of the control shaft. Since the torque required for the steering operation is also substantially constant, the partial filling of the fluid coupling required for low rotary speeds of the control shaft results in varying rotary speeds of the control shaft, as can be demonstrated diagrammatically. This condition is particularly unsatisfactory for vehicles propelled by endless track since steering of such vehicles requires substantial forces.

SUMMARY OF THE INVENTION

It is one object of the invention to overcome the disadvantages of prior art constructions for steering track-laying vehicles, and to provide a steering arrangement which, with comparatively simple transmission means, effects a reliable control of the steering without delay at all normally occurring rotary speeds of the control shaft.

Another object of the invention is to provide a steering arrangement for track-laying vehicles which is not subjected to great wear.

With these objects in view, the steering arrangement of the invention has a main shaft driving a pair of differential drives which have output means for driving two endless tracks, as is known from the prior art. The improvement of the invention comprises rotary control means, such as a control shaft, connecting steering elements of the differential drives in such a manner that the tracks of the vehicle normally move at the same speed; drive means; a pair of differential control transmissions driven by the drive means and connected with the control means, each control transmission including a freely rotatable control element so that the control transmissions normally do not transmit power to the control means; and a pair of selectively operable brake means, preferably fluid brakes, for selectively braking the control elements.

When one or the other brake means is operated, the respective control transmission transmits power to the control means and rotates the same to operate a steering element of the differential drives of the endless tracks in such a manner that the tracks run at different speeds and the vehicle is turned.

Each of the control transmissions includes three differential elements, one of which is driven, the other of which is connected with the control shaft, and the third of which is connected with a blade wheel of a fluid brake. The above mentioned control means is either a rigid control shaft or comprises two control shaft portions connected for rotation by gear means. A particular advantage of a fluid brake in such an arrangement as compared with a fluid coupling is the simplicity with which the pressure medium can be supplied and discharged. Another advantage is that the power of the fluid brake can be increased by using slanted vanes on the blade wheels. This is possible since fluid brakes operate normally at the greatest possible slippage.

In one embodiment of the invention, the input gears of the differential control transmissions are driven in the same direction of rotation so that the output gear run in opposite direction of rotation. However, for technical reasons, the use of two identical control transmissions is preferable. The two identical control transmissions can be arranged coaxial with the control shaft, so that the main drives are driven in opposite directions. Another measure to obtain a simple transmission construction is to construct the control transmissions identical and arrange the same mirror symmetrically and coaxial with the control shaft. The control transmissions are driven by bevel gears from a drive shaft.

In another embodiment, in which the control means comprises two control shaft portions, the two control transmissions are also identical and mirror symmetrically arranged but are coaxial with the drive shaft. The output gears of the control transmissions are bevel gears meshing with bevel gears on the control shaft portions. Thus, the control shaft portions are connected by bevel gears, and turn in opposite directions when one of the fluid brakes is operated. This eliminates the necessity for reversing the direction of rotation of the output gears of the main drive transmissions before being connected with the control shaft.

If for high rotary speeds of the control shaft, corresponding to small rotary speeds of the blade wheel of the fluid brake, great torques are required, at least one fluid brake is augmented by a friction brake. The operation of the friction brake is easier, and the supply and discharge of a pressure medium and cooling medium for operating the same is less complicated than when the control shaft is driven through a fluid coupling and a friction coupling is used.

In order to prevent air turbulence in the fluid brakes when the same are not filled with a fluid medium, it is advantageous to provide cover slides between the rotating blade wheel and stationary blades which serve to brake rotation of the blade wheel when the fluid brake is filled with a fluid such as oil.

The novel features which are considered as characteristic for the invention are set forth in particular in the appended claims. The invention itself, however, both as to its construction an its method of operation, together with additional objects and advantages thereof, will be best understood from the following description of specific embodiments when read in connection with the accompanying drawings.

DESCRIPTION OF THE PREFERRED EMBODIMENTS

Figure 1:
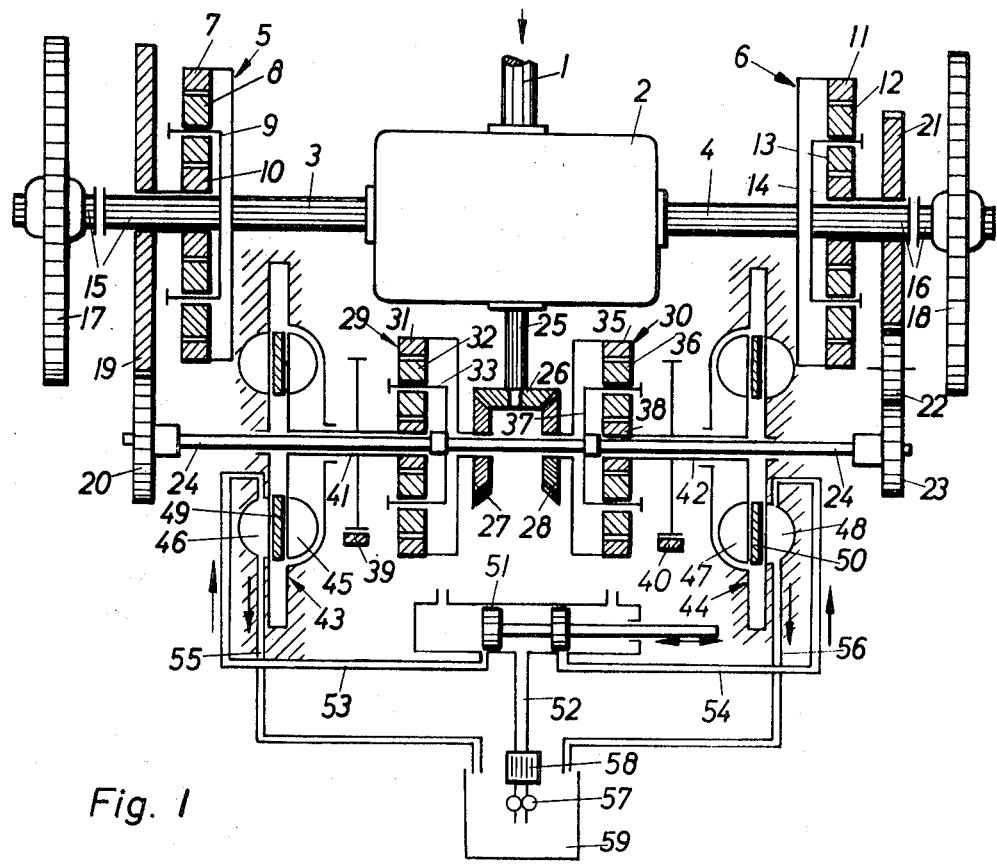
FIG. 1 is a chematic view illustrating a propelling and steering arrangement according to one embodiment of the invention.

Referring now to the drawings, and more particularly to FIG. 1, a main shaft 1, which is driven from the motor of a vehicle having a pair of endless tracks or treads of the caterpillar type, drives a pair of shafts 3 and 4 by which a pair of differential drives 5 and 6 are driven. Shafts 3 and 4 are respectively connected to orbit gears 7 and 11 which mesh with planetary gears 8 and 12 mounted on planetary carriers 9 and 13 which are fixed to output shafts 15 and 16 carrying fixed spur gears 17 and 18. Sun gears 10 and 14 are mounted on shafts 15 and 16 for free-turning movement, and are secured to spur gears 19 and 21. Power is transmitted from main shaft 1 through differential drives 5 and 6 to the output means 15, 17 and 16, 18 when steering gears 19 and 21 are blocked. A control shaft 24 carries at the ends thereof gears 20 and 23 which respectively mesh with steering gear 19 and with an intermediate gear 22 meshing with steering gear 21. Output gears 17 and 18 are respectively connected with the endless tracks of the vehicle for moving the same along a straight path when rotating at the same speed, which is the case when steering gears 19 and 21 are prevented from rotation. Since steering gears 19 and 21 tend to rotate shaft 24 in opposite directions due to the provision of intermediate gear 22, steering gears 19 and 21 are normally blocked, and the vehicle moves along a straight path when main shaft 1 is driven by the motor, not shown A drive shaft 25, which may be driven through gear transmission 2 by main shaft 1, or by an independent drive means, carries a bevel gear 26 meshing with a pair of bevel gears 27, 28 respectively secured to orbit gears 31, 35 of a pair of control transmissions 29 and 30 which further include planetary gears 32, 36 mounted on planetary carriers 33, 37 which are secured to control shaft 24.

The sun gears 34 and 38 of the control transmissions 29, 30 are connected by hollow shafts 41 and 42 to blade wheels 45 and 47 of a pair of fluid brakes 43. Brake wheels 39a and 40a are secured to shafts 41 and 42 and cooperate with brake bands 39 and 40 so that shafts 41, 42 can be braked and stopped by operation of brake bands 39 and 40.

A pump 57 pumps a liquid through a cooling device 58 and conduit 52 into the housing of a slide valve 51 which is manually operable by piston rod 51a to assume different positions in which either conduit 53 or conduit 54 is connected to the pump so that the liquid under pressure flows into chamber 46 or 48 to gradually fill the same whereby blade wheels 45 and 47 are braked. Liquid can flow through conduits 55, 56 into an oil sump in container 59 from where it is recirculated by pump 57.

Since the cross sections of the discharge conduits 55, 56 are constant, but the inlet cross sections are different in displaced positions of pistons 51, the degree of filling of the casings of the fluid brakes 43 and 44 can be controlled so that different braking torques are exerted by blade wheels 45 and 47 on sun gears 34, 38. When the casings of the fluid brakes 43, 44 are not filled, blade wheels 45, 47 encounter no resistance so that sun gears 34 and 38 are freely rotatable. Cover slides 49 and 50 are provided which separate the blade wheels 45, 47 from the stationary blades 46, 47 so that no air currents causing the development of heat are produced when no brake liquid is supplied to fluid brakes 43, 44. When valve pistons 51 are operated to fill one or the other fluid brake, cover slides 49, 50 are withdrawn, and blade wheels 45, 47 cooperate with blades 46 and 47.

A torque can be transmitted from drive shaft 25 through control transmissions 29, 30 to control shaft 24 only if sun gears 34 or 38 are braked by one or the other fluid brake 43, 44, or by one of the mechanical brakes 39, 40.

During straight movement of the vehicle, when the tracks are driven at the same speed by the output means 15, 17, control shaft 24 is at a standstill since opposite torques are transmitted by gears 20 and 23 to control shaft 24. Consequently, steering gears 19 and 21 are blocked, and permit the transmission of equal torques from shafts 3 and 4 to the tracks so that the same move at the same speed.

During this operation, valve pistons 51 are in a position in which no pressure medium is supplied to the fluid brakes 43 and 44, and brake bands 39, 40 release brake drums 39a and 40a. Consequently, blade wheels 45, 47 and sun gears 34, 38 are freely rotatable, and no power is transmitted from drive shaft 25 to the planetary carriers 33 and 37.

However, when one or the other fluid brake 43, 44 is filled with a pressure medium due to a corresponding shifting of valve pistons 51, sun gear 34 or 38 is braked and torque is transmitted by the control transmissions 29 or 30 to control shaft 24, turning the same in one or the other direction so that the steering gears 19 and 21 rotate, and influence the differential drives 5 and 6 in such a manner that the output means 17 and 18 rotate at different speeds and drive the tracks at different speeds, resulting in the turning of the vehicle.

It will be seen that sun gears 34 and 38 constitute control elements for the differential control transmissions 29 and 30, and render the same operative to transmit power only when the control elements are braked.

The brake torques produced by the fluid brakes 43 and 44 are insufficient at very low rotary speeds of sun gears 34 and 38, and under such conditions, the mechanical friction brakes are used. The slower blade wheels 45, 47 rotate, the higher is the rotary speed of control shaft 24 and a sharper turning of the vehicle is obtained.

Figure 2:
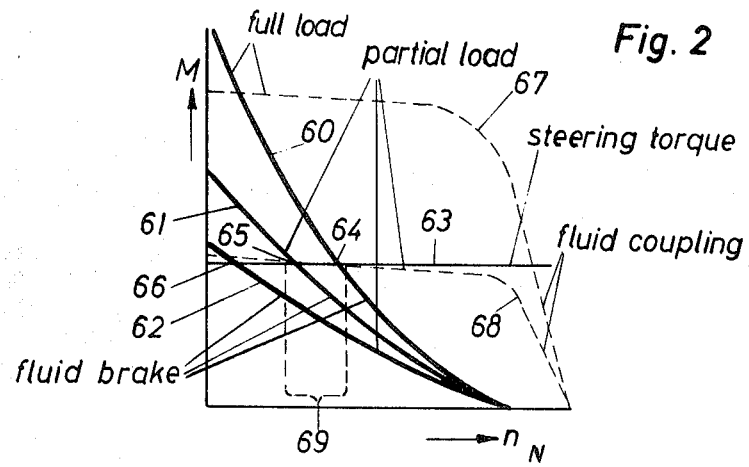
FIG. 2 is a diagram illustrating brake torques.

The diagrams of FIG. 2 show torques M depending on the number of revolutions $n_N$ of control shaft 24. Graph 60 illustrates the brake torque when the fluid brake is completely filled with brake liquid, and graphs 61 and 62 illustrate the brake torques when the fluid brakes are only partly filled. It will be seen that the brake torques are higher, the lower the speed of the control shaft is.

The torque required for steering the vehicle is indicated by the straight horizontal line 63 since the steering torque remains substantially the same at different speeds of control shaft 24. The points of intersection 64, 65, 66 of the graphs representing the brake torques with the line representing the steering torque, are clearly defined so that the power transmission is stable. If in accordance with the prior art, a fluid coupling instead of a fluid brake, is used for controlling the rotary speed of control shaft 24, the fluid coupling in completely filled condition would produce the coupling torque 67, and in partly filled condition the coupling torque 68. It will be seen that in the partly filled condition of a fluid coupling according to the prior art, the point of intersection with the line representing the steering torque is not well defined, indicating unstable conditions. Points of intersection may be anywhere in the region 69.

In the modified embodiment illustrated in FIG. 3, the general arrangement is the same as described with reference to FIG. 1 so that parts of FIG. 1 are omitted from FIG. 3.

Figure 3:
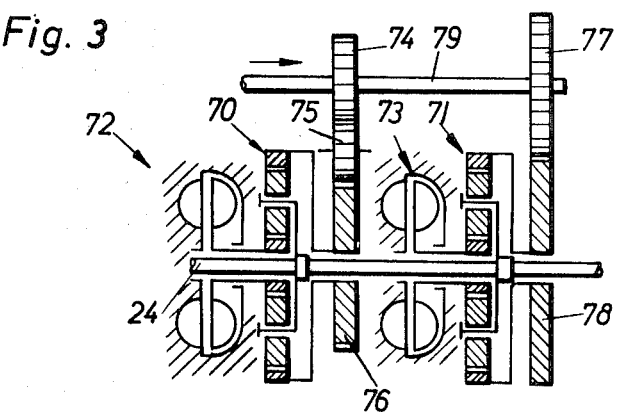
FIG. 3 is a fragmentary view illustrating a modified embodiment of the invention.

In the embodiment of FIG. 3, two differential control transmissions 70 and 71 are connected with control shaft 24 and fluid brakes 72, 73 as in the embodiment of FIG. 1. The orbit gears of the differential control transmissions 70 and 71 are respectively driven by spur gears 76 and 78 which mesh, respectively, with gears 75 and 77. Gear 77 is secured to drive shaft 79 which also carries a gear 74 meshing with gear 75. Drive shaft 79 corresponds to drive shaft 25, and may be driven from the main shaft 1, or by an independent drive motor. Drive shaft 79 drives the control transmissions 70 and 71 in opposite directions.

Figure 4:
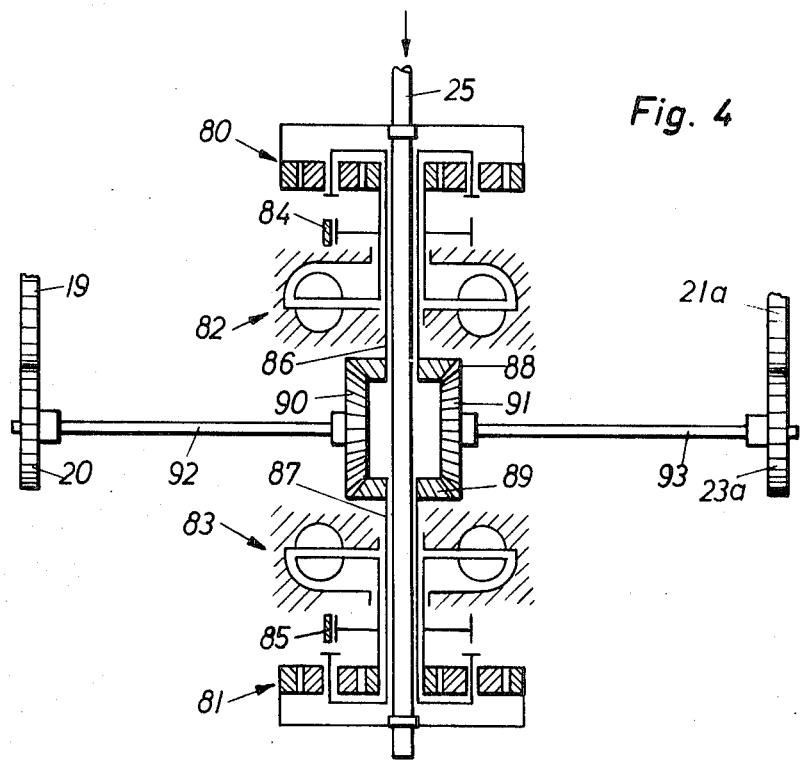
FIG. 4 is a fragmentary view illustrating another embodiment of the invention.

A third embodiment is illustrated in FIG. 4. A control shaft means including control shaft portions 92 and 93 carries gears 20 and 23a meshing with gears 19 and 21a, respectively. Gear 21a replaces gear 21 in the embodiment of FIG. 1. The control shaft portions 92 and 93 respectively carry bevel gears 90 and 91 meshing with a pair of bevel gears 88 and 89 which are mounted on hollow shafts carrying the planetary gear carriers of differential control transmissions 80 and 81. The orbit gears of control transmissions 80 and 81 are secured to drive shaft 25, and the sun gears are secured to the blade wheels of two fluid brakes 82 ad 83.

During normal straight movement of the vehicle, bevel gears 88 and 89 block-turning movement of the control shaft portions 92 and 93 so that the output means 17 and 18 are driven by differential drives 5 and 6. The intermediate gear 22 of the embodiment of FIG. 1 is omitted. When one or the other fluid brake 81, 82 is operated a torque is transmitted from shaft 25 to bevel gears 90 and 91, and the control shaft portions 92, 93 are rotated in opposite directions, causing a relative turning movement of the steering gears 19 and 21a so that the tracks of the vehicle are operated at different speeds.

It will be understood that each of the elements described above, or two or more together, may also find a useful application in other types of steering arrangements for track laying vehicles differing from the types described above.

While the invention has been illustrated and described as embodied in a steering arrangement including a pair of differential control transmissions and a pair of selectively operable brake means controlling the transmission of torque by the control transmissions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Steering arrangement for a track-laying vehicle comprising, in combination, a main shaft, and first and second drives driven from said main shaft and including first and second output means for driving two endless tracks, said output means including first and second output shafts, said output shafts having parallel axes extending in opposite directions; said drives including first and second steering-gear elements controlling said first and second output means, respectively; rotary control means including a single integral control shaft having an axis parallel with said axes of said output shafts, and forward and reverse transmission means at the ends of said control shaft connected with said first and second steering-gear elements and connecting the same with said control shaft in such a manner that said first with second output means and said tracks normally move at the same speed for moving the vehicle along a straight path while said forward and reverse transmission means are blocked by said control shaft; drive means; first and second differential control transmissions concentric with said control shaft and being driven by said drive means, said control transmissions including first and second control elements, respectively, which are freely rotatable in opposite directions so that said control transmissions normally do not transmit power to said control shaft; first and second fluid brake means including first and second casings, the first and second rotary brake members in the same, said first and second brake members being, respectively, connected with said first and second control elements and rotated by the same in opposite directions; and valve means for selectively supplying a fluid into said first and second casings for selectively braking said first and second brake members and control elements so that the respective control transmission transmits power to said control shaft and drives the same and said forward and reverse transmissions to operate said first and second steering-gear elements in opposite direction whereby said first and second output means drive said tracks for turning the vehicle.

2. Steering arrangement as claimed in claim wherein said rotary brake members are blade wheels; wherein each casing is stationary and includes stationary blades cooperating with said blade wheel; and wherein each brake means includes cover slide means operable between an inoperative position, and an operative position located between said stationary blades and said blade wheel for preventing air currents when no fluid is in the respective casing; and means for cooling fluid supplied to said casings 3. Steering arrangement as claimed in claim 1, wherein said drives are planetary drives having said common axis, each drive including an input transmission member connected with said main shaft, an output transmission member connected with one of said output means, and a third transmission member connected with one of said steering-gear elements; wherein said main shaft is located in a plane of symmetry; wherein said common axis and the axis of said control shaft are perpendicular to said plane; wherein said first and second drives, said forward and reverse transmissions, said control transmissions, and said brake means are disposed symmetrically to said plane of symmetry; wherein said drive means has an axis of rotation located in said plane of symmetry and includes first and second gears rotating in opposite directions; and wherein said first and second control transmissions include first and second input elements connected with said first and second gears, first and second output elements connected with said first and second control elements, and first and second intermediate elements connected with said control shaft.